United States Patent
Olsta et al.

(10) Patent No.: US 8,042,696 B2
(45) Date of Patent: *Oct. 25, 2011

(54) CONTAMINANT-REACTIVE GEOCOMPOSITE MAT AND METHOD OF MANUFACTURE AND USE

(75) Inventors: James T. Olsta, Bartlett, IL (US); Charles J. Hornaday, Arlington Heights, IL (US); Robert J. Trauger, Cary, IL (US); Jerald W. Darlington, Jr., Marengo, IL (US)

(73) Assignee: AMCOL International Corporation, Hoffman Estates, IL (US)

( * ) Notice: Subject to any disclaimer, the term of this patent is extended or adjusted under 35 U.S.C. 154(b) by 1189 days.

This patent is subject to a terminal disclaimer.

(21) Appl. No.: 11/599,080

(22) Filed: Nov. 14, 2006

(65) Prior Publication Data

US 2007/0059542 A1    Mar. 15, 2007

Related U.S. Application Data

(63) Continuation of application No. 11/489,383, filed on Jul. 19, 2006, which is a continuation of application No. 10/718,128, filed on Nov. 19, 2003, now abandoned.

(51) Int. Cl.
  *B01D 39/02* (2006.01)
  *B01D 39/06* (2006.01)
  *B01D 39/00* (2006.01)

(52) U.S. Cl. .............. 210/502.1; 210/503; 210/505; 156/276; 156/145; 156/620; 264/112; 264/71

(58) Field of Classification Search ............... None
  See application file for complete search history.

(56) References Cited

U.S. PATENT DOCUMENTS 4,250,172 A   2/1981   Mutzenberg et al.
(Continued)

FOREIGN PATENT DOCUMENTS

GB    2337723 A    12/1999

OTHER PUBLICATIONS

Lorah et al., "Development and Performance Monitoring of a Dechlorinating Culture and an Innovative Bioremediation Remedy at the Ground-Water/Surface-Water Interface," Groundwater/Porewater/Surfacewater Interactions (Platform Papers).

D. Instanes, "Pollution Control of a Norwegian Fjord by Use of Geotextiles," Proceedings, The Fifth International Conference on Geotextiles, Geomembranes and Related Products, Singapore, pp. 1053-1056, (1994).

Ling et al., "Appendix C: Case Studies on Geotechnical Aspects of In-Situ Sand Capping," Guidance for In-Situ Subaqueous Capping of Contaminated Sediments, pp. C1-C19 (1998).

(Continued)

*Primary Examiner* — Krishnan S Menon
(74) *Attorney, Agent, or Firm* — Marshall, Gerstein & Borun LLP (57) ABSTRACT

Reactive geocomposite mats, and their method of manufacture, for treating contaminants in soil or water that allow the passage of essentially non-contaminated water therethrough. The geocomposite mat includes a pre-formed woven or non-woven geotextile, having a thickness of about 6 mm to about 200 mm, and having, a porosity sufficient to receive a powdered or granular contaminant-reactive material, contaminant-sorptive material, or a contaminant-neutralizing material (hereinafter collectively referred to as "contaminant-reactant material" or "contaminant-reactive material") throughout its thickness, or in any portion of the thickness across its entire major surface(s). The powdered or granular contaminant-reactive material is disposed within the pores of the previously formed, high loft geotextile mat to surround the fibers, e.g., by vacuum or vibrating the high loft mat while in contact with the contaminant-reactive material to allow the powdered or granular contaminant-reactive material to flow by gravity into the pores of the previously formed geotextile and vibrational forces. Liquid-permeable cover sheets are adhered to the upper and lower major surfaces of the filled geotextile to prevent the powdered or granular material from escaping from the geotextile during transportation and installation.

19 Claims, 3 Drawing Sheets

U.S. PATENT DOCUMENTS

| | | | |
|---|---|---|---|
| 4,622,260 A | | 11/1986 | Tesch |
| 5,043,076 A | * | 8/1991 | Alexander .................... 210/679 |
| 5,237,945 A | * | 8/1993 | White ........................... 112/420 |
| 5,346,565 A | * | 9/1994 | White ............................. 156/71 |
| 5,900,085 A | * | 5/1999 | Clarey et al. ................. 156/62.2 |
| 6,610,781 B1 | * | 8/2003 | Zhou et al. .................... 524/789 |
| 7,128,498 B2 | | 10/2006 | Sheahan et al. |

OTHER PUBLICATIONS

S. Maynord, "Appendix A: Armor Layer Design," Guidance for In-Situ Subaqueous Capping of Contaminated Sediments, pp. A1-A15 (1998).

* cited by examiner

CONTAMINANT-REACTIVE GEOCOMPOSITE MAT AND METHOD OF MANUFACTURE AND USE

CROSS-REFERENCE TO RELATED APPLICATIONS

This application is a continuation of U.S. application Ser. No. 11/489,383 filed Jul. 19, 2006, which is a continuation of U.S. application Ser. No. 10/718,128 filed Nov. 19, 2003, now abandoned.

FIELD OF THE INVENTION

The present invention is directed to a reactive geocomposite for controlling or preventing the further spread of contaminants in soil or water. More particularly, the geocomposite described herein includes a reactive core formed from a high loft geotextile that is filled with a powdered or granular reactive material, such as activated carbon, coke breeze, peat moss, polymeric ion exchange resins, polymeric adsorbing resins; zero-valent iron, apatite, organophilic clay, zeolite, diatomaceous earth or mixtures thereof and having a liquid-permeable cover sheet attached to the upper and lower major surfaces of the filled geotextile.

BACKGROUND AND PRIOR ART

The prior art is replete with methods and articles used to confine or store a wide variety of environmental contaminants ranging from completely capping, in-situ, contaminated sediments that are left in-place in underwater environments; terrestrial landfills wherein dredged or otherwise collected contaminated sediments are placed within an engineered disposal site surrounded with an impervious liner system and capped with an impervious material; and the use of a reactive mat and/or reactive backfill that surrounds the contaminated material. Examples of reactive mats are found in U.S. Pat. No. 6,284,681 B1 ('681) and published application US 2002/0151241 A1 ('241). The reactive mats described in these two publications include one or more layers of reactive material each surrounded by geotextiles that allow contaminated liquid to pass through the reactive mat for sorption or reaction of the contaminate with a reactive material contained between the geotextile layers, and in the case of the '241 published application, the mat may be deployed vertically.

One of the major problems encountered with the use of reactive mats for controlling or confining contaminated materials, or in controlling or preventing leaching of contaminants from sediments and preventing the contaminants from entering ground water supplies or from traversing through a lake or ocean soil interface into the lake or ocean, is in the ability to provide a transportable mat having a sufficient volume or thickness of reactive material so that the mat provides very long term protection without the necessity of periodic replacement. The reactive mats described in the '681 patent and in the '241 publication provide alternating layers of geotextile/reactive material/geotextile/reactive material since a sufficient thickness of reactive material cannot be provided in a single reactive material core layer without that reactive material being lost during transportation or installation.

This assignee's U.S. Pat. Nos. 5,237,945 ('945) and 5,389,166 ('166) describe the manufacture of a water barrier formed from a clay-fiber mat that may include, intermixed with a powdered or granular bentonite clay, a powdered or granular liquid-interacting material, e.g., a contaminant-reactant, or providing the contaminant-reactant as a separate layer in the water barrier product. The water barrier mat formed in accordance with the '945 and '166 patents is manufactured by laying down geosynthetic fibers and the water swellable clay, with or without the contaminant-reactant material, simultaneously. In this manner, a geosynthetic composite material can be manufactured wherein the geosynthetic fibers are surrounded by the water-swellable clay, with or without the contaminant-reactant material, in initially forming a relatively thick geotextile. Such a mat must be subsequently consolidated after the initial formation of the mixture of powdered or granular material and fibers in an attempt to secure the fibers in position surrounding the powdered or granular material. The following problems may be encountered with filled mats manufactured by simultaneously mixing individual fibers together with powdered or granular materials in accordance with this assignee's U.S. Pat. Nos. 5,237,945 and 5,389,166:

(1) Because interior fibers within the geotextile are not secured to adjacent fibers, particularly in thick mats, there would be lateral movement of powdered or granular material within the mat, particularly at the center of the mat thickness; (2) Any reactive materials that have a relatively high hardness, e.g., coke breeze, will prevent needle-punching as a means to consolidate the mats described in the '945 and '166 patents, since the hard materials will cause needle breakage and frequent replacement of worn needles; (3) Needle-punching as a means to consolidate the '945 and '166 mats is limited to relatively thin mats, e.g., less than 1 inch or 2.54 cm (25.4 mm), since fibers are too short to traverse the thickness of thicker mats for effective connection; and (4) Because of the shifting of fibers and powdered or granular material during manufacture of the '945 and '166 mats, the powdered or granular material will not be placed within the mat in a consistent quantity (weight per unit volume) and, therefore, will not provide consistent contaminant reaction, contaminant sorption, or contaminant neutralization per unit area. Another issue with the '945 and '166 mats is that when water swellable sodium bentonite clay is utilized, with or without the reactive material, when the sodium bentonite clay swells, the resulting swell pressure restricts the aqueous flow through the mat.

SUMMARY

In brief, described herein are reactive geocomposite mats, and their method of manufacture, for controlling contaminants in soil or water that allow the passage of essentially non-contaminated water therethrough. The geocomposite mat includes a pre-formed woven or non-woven geotextile, having a thickness of about 6 mm to about 200 mm, preferably about 10 mm to about 100 mm, and having a porosity sufficient to receive a powdered or granular contaminant-reactive material, contaminant-sorptive material, or a contaminant-neutralizing material (hereinafter collectively referred to as "contaminant-reactant material" or "contaminant-reactive material") throughout its thickness, or in any portion of the thickness, across its entire major surface(s). The powdered or granular contaminant-reactive material is disposed within the pores of the previously formed, high loft geotextile mat to surround the fibers, e.g., by vacuum suction or by vibrating the high loft mat while in contact with the contaminant-reactive material to allow the powdered or granular contaminant-reactive material to flow, by gravity and vibrational forces, into the pores of the previously formed geotextile. Liquid-permeable cover sheets are adhered to the upper and lower major surfaces of the filled geotextile to prevent the powdered or granular material from escaping from the geotextile during transportation and installation.

Optionally, the edges of the filled geotextile can be sealed, such as by providing the upper and lower cover sheets slightly larger than the dimensions of the geotextile and gluing the extra cover sheet material to the edges of the filled geotextile or heat sealing them together. Other edge sealing options include sewing, needlepunching, and ultrasonic welding of the cover sheets together or by applying a separate, edge-covering material that can be glued, heat sealed or ultrasonically welded to the cover sheets. Edge sealing materials may be liquid-impermeable or liquid-permeable.

Suitable powdered or granular contaminant-reactive materials include organophilic clay, activated carbon, coke breeze, zero-valent iron, apatite, zeolite, peat moss, polymeric ion exchange resins, polymeric adsorbents and mixtures thereof. If the contaminant-reactive material is lighter than water, where the reactive mat is intended for sub-aqueous disposition, such as activated coke breeze, the geotextile fibers will be a material that his heavier than water, such as a polyester. Any geosynthetic fibers may be used where the reactive material is heavier than water, such as polyolefins, e.g., polypropylene, polyethylene and copolymers thereof; rayon; polyesters; nylon; acrylic polymers and copolymers; polyamides; polyamide copolymers; polyurethanes, and the like.

The method of manufacture permits the manufacture of a geocomposite article that includes a contaminant-reactant material that is structurally secure, without lateral movement, and contains contaminant-reactant material uniformly disposed throughout the thickness, or throughout a desired upper and/or lower portion of the thickness of the geocomposite. The geocomposite can be manufactured to provide either a flexible or a rigid geocomposite material, and permits the manufacture of various modified geocomposites; geocomposite articles that include a contaminant-reactant material, such as a zeolite or an organophilic clay with or without a water-absorbent material for treatment of contaminants in water, in an organic liquid, or in a mixture of water and an organic liquid; a minimum of leakage of powdered or granular materials held by the pre-formed mat; the application of layer(s) of liquid-permeable films or sheets of material over both major surfaces of the article to confine the granular or powdered material in place within the pre-formed geotextile; the application of solid or liquid adhesive materials or compositions to one or both major surfaces and/or to any of the edges of the geocomposite article for complete retention of essentially all powdered and/or granular materials; the capability of inserting one or more rigidifying materials into, or onto, the geocomposite article during manufacture, such as a sheet of perforated fiberglass; rope; cardboard; relatively rigid, liquid-permeable corrugated materials, e.g., corrugated cardboard, and the like at some point at or between the top and bottom major surfaces of the geocomposite article to provide various degrees of flexibility or rigidity; the capability of manufacturing the geocomposite articles without the necessity of a consolidation step; and providing various sizes, shapes and weights of pre-formed, high loft geotextiles to achieve the benefits of each. If a water-absorbent, water-swellable material, such as sodium bentonite is included with the contaminant-reactive material, it should be included in an amount less than about 20 $lb/ft^3$, preferably 0 to about 10 $lb/ft^3$, more preferably 0 to about 5 $lb/ft^3$ so that, upon swelling, it does not prevent the flow of contaminated water through the geocomposite mat.

The contaminant-reactant material can be withheld from an upper or lower major surface of the high loft geotextile, if desired, to provide a space or area for the contaminant-reactant material to expand upon reaction or sorption with, or neutralization of the contaminants; or to provide areas for the addition of other powdered or granular materials, such as an organophilic clay, a zeolite or other contaminant-treating material. For example, the contaminant-reactant material can be omitted throughout a predetermined thickness at the top major surface or the bottom major surface. Alternatively, a powdered or granular water-swellable clay material can be applied in a relatively high concentration at or near the edges of the geocomposite article adjacent to one or both major surfaces to permit the contaminant-reactant material layer to extrude through a water-permeable cover layer to a planar edge surface immediately above and/or below one or both exterior major surfaces, thereby creating a sealing layer of contaminant-reactant material capable of sealing at overlaps and seams between adjacent or overlapping geocomposite articles.

Figure 6:
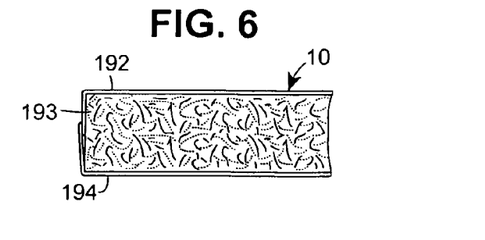
FIG. 6 is a partially broken-away side view of an edge of the geocomposite article having excess material from upper and lower cover sheets adhered together, either adhesively, by heat-sealing, or by ultrasonic welding, to seal the edges of the article.

As shown in FIG. 6, it is preferred to seal the edges 193 of the filled geocomposite articles 10 by providing excess cover material 192 and/or 194 in an amount sufficient so that one or both of the cover layers 192 and/or 194 can be overlapped and adhered together, at or above the edge 193, via an adhesive, thermal bonding (heat-sealing), needle punching, or sonic welding.

Accordingly, one aspect of the geocomposite articles described herein is to provide a new and improved article of manufacture and method of making the article by incorporating a powdered or granular contaminant-reactant material into a high loft, pre-formed mat of interconnected, geotextile fibers.

A further aspect of the geocomposite articles described herein is to provide a new and improved article of manufacture including a powdered or granular contaminant-reactant or contaminant-interacting material, wherein the material is selected from the group consisting of an organophilic clay, a zeolite, a contaminant-absorbent, a contaminant-adsorbent, an ion-exchange material, a contaminant-reactant, a contaminant-neutralizing material, and mixtures thereof as separately applied or intermixed material. The powdered or granular materials may be applied as an admixture, or applied sequentially within a pre-formed textile mat having a sufficient apparent opening size, e.g., about 0.5 to about 6 mm, preferably about 1 mm to about 4 mm, to receive the powdered or granular material in an amount of at least about 10 $lb/ft^3$ up to about 150 $lb/ft^3$, preferably about 30 $lb/ft^3$ to about 100 $lb/ft^3$, throughout the thickness, or throughout any upper or lower portion of the thickness of the pre-formed mat. Preferably, the powdered and/or granular material will occupy about 50% to about 99.9% by volume of the pre-formed geotextile mat, more preferably about 80% to about 99.9% of the pre-formed mat.

The above and other aspects and advantages of the geocomposite articles and their method of manufacture will become apparent from the following detailed description of the preferred embodiments taken in conjunction with the drawings.

DETAILED DESCRIPTION OF THE PREFERRED EMBODIMENTS

Figures 1, 2A, 2B:
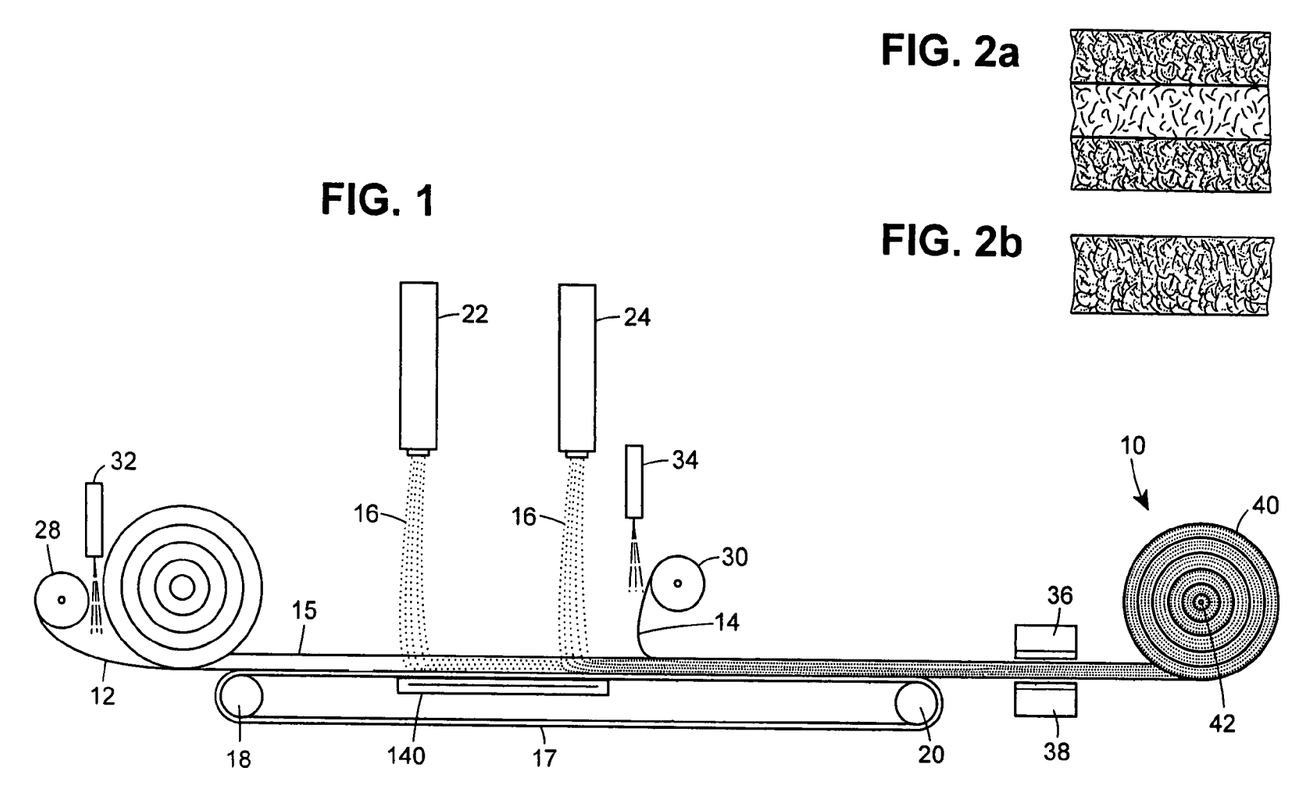
FIGS. 1 and 3 are partially broken-away, schematic views of alternate methods of manufacture and apparatus used to make the geocomposite articles described herein.
FIG. 2a is an enlarged, partially broken-away side view of a reactive geocomposite article formed with upper and lower layers of powdered or granular contaminant-reactant material.
FIG. 2b is an enlarged, partially broken-away side view of a reactive geocomposite article of that has been filled with a powdered or granular contaminant-reactant material, such as an organophillic clay, over the entire thickness of the mat.

Turning now to FIG. 1, there is shown a schematic diagram for manufacturing the geocomposite articles 10 described herein, including many optional features any one or more of which can be included in the manufacturing process to provide various characteristics and properties to the geocomposite articles.

The geocomposite article 10 is manufactured to include a layer of woven or non-woven liquid-permeable sheet material 12 and 14 on both major exterior surfaces; various reinforcing material can be included within the interior and/or exterior of the article to provide structural reinforcement or to provide various degrees of article rigidity; portions of the high loft geotextile 15, along its upper and/or lower major surfaces can be left with low concentrations of, or without, a powdered or granular material so that a portion of the article is very porous to allow for venting of gases captured by the article from below; and powdered or granular materials such as a contaminant (organic) reactant absorbent or adsorbent, and, optionally a water-absorbent material, such as bentonite clay can be intermixed with the contaminant-reactant material(s) 16 being deposited onto the pre-formed, high loft geotextile 15. Any of these features can be used alone or together with any of the other features, as best shown in FIGS. 1 and 3, to provide very unique geocomposite articles having any number of different properties and the capability of containing the spread of contaminants.

Figure 3:
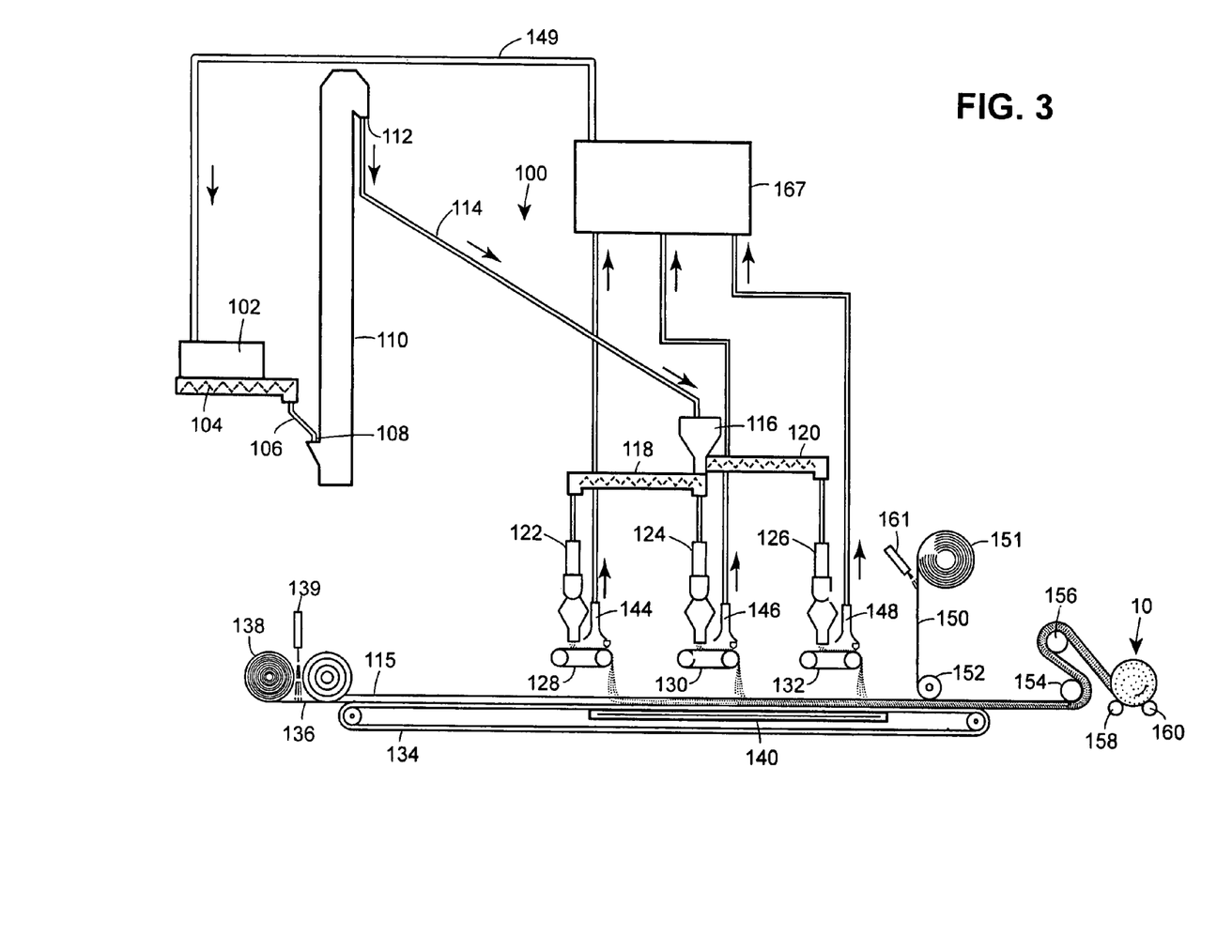

As shown in FIGS. 1 and 3, there is illustrated a method and apparatus, including a number of optional features each of which can be used alone or in combination with any of the other features for manufacturing a product having single or plurality of different granular or powdered contaminant-reactant materials, and with or without various reinforcing materials and/or coating materials added to one or both exterior surfaces of the article being manufactured to provide various characteristics or properties to the finished geocomposite article 10, as will be described in more detail hereinafter. The apparatus generally includes a conveyor belt 17 that travels continuously around a pair of rollers 18 and 20, at least one of which is motor driven at a desired speed; and one or more contaminant-reactant feeding devices, generally designated by reference numerals 22 and 24.

The liquid-permeable sheet material layers 12 and 14, used to prevent loss of the powdered or granular material during transportation and installation, are applied to the upper and lower major surfaces of the pre-formed, high loft geotextile after loading the geotextile 15 with contaminant-reactant material. The preferred method of manufacture is to first adhere the lower liquid permeable sheet material 12 to the high loft geotextile 15 then fill the high loft geotextile 15 with the powdered or granular material, followed by adhering the upper, liquid-permeable sheet material 14 to the high loft geotextile containing the powdered or granular material. In one embodiment, the powdered or granular material 16 penetrates the high loft geotextile 15 by vibrating the geotextile 15 with vibrator 140. Alternatively, vacuum can be applied under the geotextile 15.

Additional contaminant-reactant material in granular or powdered form can be applied to the filled geotextile 15 from feeding conduit 24 to provide one or more surface concentrations of contaminant-reactant material or to apply a different powdered or granular contaminant-reactant, prior to applying the water-permeable cover layers 12 and 14. Upper and lower major surfaces then are covered with the water-permeable, preferably non-woven, cover layers 12 and 14, from rolls 28 and 30, that are preferably adhered to the major surfaces of the geotextile 15 using a water-insoluble adhesive, applied from adhesive supply vessels 32 and 34.

Additionally, slicing or searing devices 36 and/or 38 can be provided above and/or below the article to provide extrudability to the contaminant-reactant material from the article, e.g., for sealing a plurality of the geocomposite articles at overlaps. The slicing or searing devices 36 and/or 38 can be used to slice and/or sear one or both of the cover layers 12 and/or 14, at any point during the manufacture of the article 10, for improved extrusion to provide seam and/or overlap sealing of adjacent articles, or the slicing step can be bypassed. The finished article 10 can be collected in a roll form 40 taken up on a suitable mandrel 42 or can be festooned onto pallets (not shown) or the like.

FIG. 2a shows high loft geotextile mat 15 filled only on upper and lower major surfaces with the powdered or granular material 16. FIG. 2b shows the high loft geotextile mat 15 filled with a powdered or granular material 16 incorporated throughout the geotextile mat 15.

Turning now to FIG. 3, there is shown a schematic diagram of one method of loading the pre-formed, high loft geotextile mat 115 with powdered or granular contaminant-reactant material in a dry state. The dry material feeding apparatus, generally designated by reference numeral 100 is useful for depositing one or more powdered or granular contaminant-reactant materials, such as an organophillic clay, from a receiving hopper 102. An auger 104 is disposed at a lower end of the receiving hopper 102, and in fluid communication therewith, to force the contaminant-reactant material through conduit 106 to an inlet 108 of elevator 110. The contaminant-reactant is discharged from the elevator 110 at elevator outlet opening 112, through conduit 114 into a receiving hopper 116. A pair of augers 118 and 120 in fluid communication with a lower portion of hopper 116 force the contaminant-reactant into one, two or three feeding mechanisms, generally designated by reference numerals 122, 124 and 126, for feeding the contaminant-reactant material in a controlled manner to one, two or three continuous feed conveyor belts 128, 130 and 132 successively aligned above an elongated product conveyor belt 134. The contaminant-reactant generally is applied over the high loft, geotextile mat 115 to substantially fill the void spaces between fibers in the high loft, geotextile mat 115 in an amount of about ¼ to 30 pounds of powdered or granular material per square foot of finished article major surface area, preferably about ¼ to about 5 pounds of powdered or granular material per square foot of article major surface area. In accordance with one embodiment, a supply of a liquid-permeable flexible sheet material 136 in roll form 138 is disposed above the continuous product conveyor belt 134 to provide a continuous supply of liquid-permeable flexible sheet material onto an upper surface of the product conveyor belt 134. The upper surface of sheet material 136 from roll 138 is sprayed with liquid adhesive from adhesive vessel 139 to adhere the sheet material to an under surface of the high loft geotextile 115, and the geotextile 115 then is filled with the powdered or granular material, from one or more of the feeding mechanisms 122, 124 and/or 126, deposited onto the geotextile 115 from one, two or all three of the feed conveyor belts 128, 130 and 132. Any one, two or all three of the feed conveyor belts 228, 230 and 232 can be used to incorporate the same or different powdered or granular contaminant-reactant materials throughout a portion of, or the entire thickness of the geotextile 115. Vibration apparatus 140 is connected to the product conveyor belt directly below the feed conveyor belts 128, 130, and 132 to vibrate the powdered or granular contaminant-reactant materials into the geotextile 115.

The individual powdered or granular materials are deposited across the entire width of the geotextile mat 115, as the particles drop from the feeders 122, 124 and/or 126. In this manner, the entire thickness or any portion of the thickness of the fibrous mat 115 is filled with the contaminant-reactant material. Dust collection suction devices 144, 146 and 148 may be disposed near each continuous contaminant-reactant feed conveyor belt 128, 130 and 132 to clear the air of fine particles emanating from feeding mechanisms 122, 124 and 126 and return the particles back to a dust collector 167 for disposal and/or back to the receiving hopper 102, via conduit 149. A second flexible, water-permeable sheet material 150, from roll 151, is disposed on a downstream side of the clay feeding mechanisms 122, 124, and 126 and above the product conveyor belt 134. The second flexible sheet material 150 is fed by power driven roller 152, power rollers 154 and 156 and wind up rollers 158 and 160 to dispose flexible, water-permeable sheet material 150 on top of the contaminant-reactant-filled article to dispose the filled geotextile material 115 between lower flexible sheet material 136 and upper flexible sheet material 150. Adhesive vessel 161 applies adhesive to a surface of sheet material 150 to adhere the sheet material 150 to an upper surface of the filled geotextile 115.

The powdered or granular contaminant-reactant material utilized to fill the void spaces between the fibers of the high loft, geotextile has a particle size in the range of about 1 to about 400 mesh, preferably about 10 to about 200 mesh.

Figure 4A:
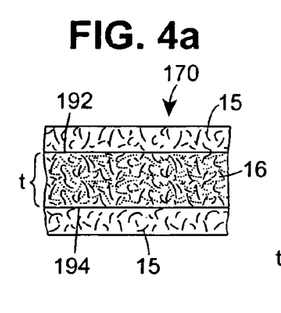
FIGS. 4a, 4b and 4c are enlarged, broken-away side views of articles manufactured as described herein that include intermediate liquid-permeable sheets or nets of strengthening materials and include a powdered or granular contaminant-reactant material in only a portion of the thickness of the article.
Figure 4B:
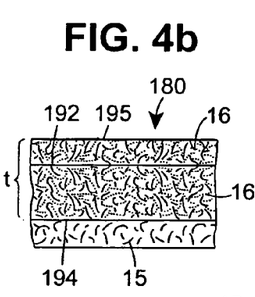
Figure 4C:
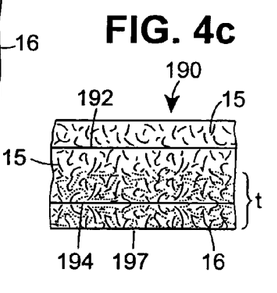

As shown in FIGS. 4a, 4b and 4c, the articles of manufacture generally designated by reference numerals 170, 180 and 190, respectively, are manufactured to include a powdered or granular material, such as an organophillic clay 16, incorporated into the geotextile 15 throughout only a portion of the overall thickness "t" of each article 170, 180 and 190. Each article 170, 180 and 190 is shown to include an upper sheet or netting 192 and a lower sheet or netting 194 of liquid-permeable polymeric sheet material, rope, netting, or other strengthening, or rigidifying materials, the same or different, incorporated within the interior of the article during manufacture in any desired combination. The article 170 of FIG. 4a includes the powdered or granular material 16 incorporated over a central portion of the article, defined between the two internal sheet or netting materials 192 and 199. The article 180 of FIG. 4b includes the powdered or granular material 16 in an upper portion of the article, above sheet material 192, and under an upper, liquid-permeable sheet material 195, as well as in a central portion of the article 180, between sheet material 192 and sheet material 194. The article 190 of FIG. 4c includes the powdered or granular material 16 incorporated within a lower half of the article 190, filling a lower portion of the article 190 between sheet material 194, and lower, liquid-permeable sheet material 197, and within a lower half of the central portion of article 190 between lower material 194 and upper material 192. Such materials may be manufactured by adhesively securing multiple articles, filled or unfilled, each filled portion being manufactured in accordance with the description of FIGS. 1 and 3.

Some of the most prevalent contaminants found in waste waters contained in ponds, lagoons, areas of subterranean structure and other water-releasing or organic (hydrocarbon) spill areas, particularly where these areas include industrial waste waters, are heavy metal ions and water-insoluble or partially water-insoluble organic materials. It is well known in the prior art that natural and synthetic zeolites and ion exchange resins are capable of removing a substantial portion of the heavy metal ions from a waste water solution and that organophilic clays are capable of removing water-insoluble organic materials from solution. However, the prior art suggests that removal of these materials from waste water streams should be done on-stream, treating the entirety of the waste water stream in order to remove these materials, requiring frequent replacement of treating materials because of the heavy volumes of waste water stream that passes through the zeolites or passes through the organophilic clays in order to clarify these waste water streams. By including an organophilic clay, or applying a mixture of water-swellable clay (not required) with a zeolite or organophilic clay, to fill the voids between fibers of the high loft geotextile 15 or 115, the zeolite and/or organophilic clay will form a water-treatment material wherein the zeolite and/or organophilic clay will remove the contaminants, e.g., hydrocarbon contaminants, and allow the clean water to pass through the geocomposite article 10.

Figure 5:
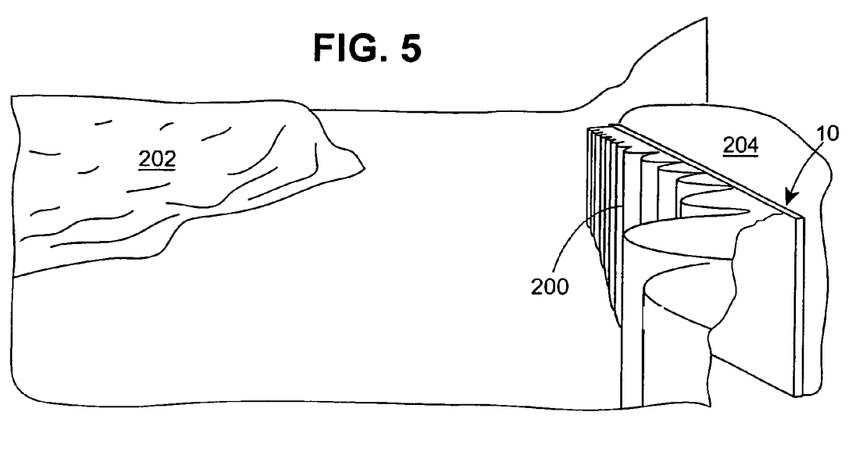
FIG. 5 is a perspective view showing the geocomposite article described herein oriented vertically, adjacent to a sea/soil interface, for sorbing contaminants, e.g., hydrocarbons from a petroleum fraction, that leach through soil and travel-through the sea/soil interface, into the sea, to prevent the contaminants from traversing the sea/soil interface.

As shown in FIG. 5, the geocomposite articles 10 described herein are particularly effective for vertical disposition adjacent to a sea/soil interface 200 for protecting a lake or ocean 202 against hydrocarbon contaminants that otherwise leach through soil 204 and penetrate the sea/soil interface 200.

In accordance with another important embodiment of the geocomposite articles described herein, the contaminant-reactant material, comprising any contaminant-adsorbent, -absorbent, -reactant, or -neutralizing material can be supplied as a separate layer adjacent to another powdered or granular contaminant-reactant material so that the amount of material treated for the removal of a given contaminant is only that material which penetrates the adjacent layer of powdered or granular material.

In accordance with another important feature of the present invention, the contaminant-reactant materials mixed or supplied as separate layers can be any material capable of adsorbing, absorbing, neutralizing, or reacting with the contaminant for insolubilization and/or separation of the contaminant from the liquid stream flowing through the reactive material. Examples of materials capable of removing or neutralizing contaminants include absorbent fibers, such as microcrystalline cellulose; attapulgite clay; zinc rincinoleate absorbed on an absorbent fiber or other absorbent material; amorphous silica powder; synthetic calcium silicate; polyolefin pulp; sodium alumino-silicate (type A sodium zeolite); maltodextran; sodium silica aluminates (note that all the above are absorbents). Other materials, such as adsorbents include microcrystalline cellulose; silica hydrogel based compositions; attapulgites; synthetic sodium magnesium silicates; synthetic calcium silicates; silicon dioxide; acid activated clays; type A sodium zeolites; and the like provided as a separate layer or mixed with the absorbents and/or adsorbents. Other materials can be included such as an algicide, antimicrobial material, bactericide, disinfectant, and/or fungicides such as phenol; zinc undecylenate N.F.; acetyl tyridinium chloride N.F.X.III and the like.

Most preferred as the adsorbent, absorbent and/or reactant and/or neutralizing material are coke breeze, activated carbon, natural or synthetic zeolites, apatite, and/or an organophilic clay, which is basically a montmorillonite clay that has been reacted with a quaternary organic material to make it hydrophilic and absorbent to organic contaminants.

The high loft geotextile mat 15 or 115 can be woven or non-woven. Suitable fibers of construction of the geotextile mat 15 or 115 include fibers made from rayon, polypropylene, polyesters, nylon, acrylic polymers and copolymers, ceramic fiber, fiberglass, propylene-ethylene copolymers, polypropylene-polyamide copolymers, a single monofilament, polyethylene, polyurethane, cotton, jute and any other non-biodegradable, or very slowly biodegradable, fibers preferably having both bacteriological and chemical resistance. In some installations, the thickness of the article is not important and such articles can be formed with any desired thickness, e.g., 3 mils to about 4 inches containing about 0.2 to about 30 pounds per square foot of contaminant-reactant material.

The above-described products can be modified in a number of ways to suit various purposes and this adaptability of the products is one of the primary benefits when compared with water barriers of the prior art. For example, the geocomposite products described herein can be loaded with a heavy material such as metal screen, or a heavy mineral such as Barite, iron oxide or the like, relatively uniformly, together with a powdered or granular contaminant-reactant so that the overall product has a specific gravity greater than 1.0 thereby enabling the material to submerge easily in water. Accordingly, the product can be applied to the soil surface at the bottom of a filled lagoon, waste containment area, and the like, without first draining the lagoon or waste containment area. The product containing a heavy mineral can be rolled out over the water or waste containment upper level and allowed to sink to cover the soil surface at the bottom of the water or liquid waste material, thereby saving substantial time, effort and expense in sealing a pre-existing lagoon, waste containment area, and the like, without first draining the lagoon or waste containment area.

In another embodiment, the products described herein can have incorporated therein a very light material such as expanded vermiculite or expanded perlite, so that the product has substantial buoyancy in water, liquid waste materials, and the like, to form a cover over a liquid waste containment area, such as a toxic waste lagoon, to prevent external compounds, dust, and dirt from entering the waste containment area. One portion of this cover material can be adapted for removal or rolling back so that additional toxic waste and the like may be added to the covered containment area while maintaining a water-impervious cover to prevent further filling of the waste containment area with rain water.

The products described herein can be essentially a single non-woven fabric material, so that it can elongate, where elongation is a desirable characteristic, while retaining the desired contaminant-removal characteristics. Further, drainage structures and other articles used in the water drainage arts can be virtually incorporated into the interior of this product during manufacture, e.g., under the upper and/or lower cover sheets. Herbicides, bactericidal materials, tracer chemicals, various colorants that indicate contact with a particular chemical or class of chemicals, and the like, also can be incorporated into the articles described herein.

The product is particularly effective in shored wall conditions for application against steel sheet piling; soldier beam and lagging; soldier beam and earth installations; concrete caissons; earthen stabilized wall structures and diaphram wall structures. In addition to the usual geotextile-type fibers, cellulosic fibers can be used as well as hay, straw, coconut fibers and fibers refined from wood chips and the like, particularly for use as an agricultural root zone liner to provide liquid feed for the promotion of plant growth. The products described herein are also useful as gas barriers, particularly Radon gas barriers, to protect structures and containers above or below ground. Many other uses for the products of the present invention should be apparent to those skilled in the art.

The uses for the powdered or granular material-filled or partially-filled products described herein are virtually infinite since the product can be made completely flexible, relatively rigid or rigid and can be applied against very contoured and slopping surfaces, rough or smooth, as well as vertical surfaces, such as foundation walls, dams, along the sides of canals and below grades such as in tank farms, and for irrigation and water conservation techniques. The products are substantially better than layered products having an intermediate layer of powdered or granular material since the fabric of the present invention will not peel apart and the contaminant-reactant material has much less tendency to leak out of the product during handling and installation. Further, there is essentially no slippage of fabric since the product is, basically, a single non-woven fabric containing active material(s).

The products have a number of other advantages over the prior art layered products that include an upper and lower fabric surrounding an interior layer of bentonite clay since the products can be, essentially, a single fabric layer that is filled or partially filled with any desired powdered or granular contaminant-reactant material, while optionally including interior space for absorption or expansion of an interior powdered or granular material, such as a water-swellable clay. The products are particularly well suited for providing contaminant-removal in shored wall conditions to protect surface areas that are either vertical, sloped or horizontal. The products are very durable because of the method of manufacture, since strength is not dependent upon any method of structurally securing two separate fabric layers together across an intermediate layer of powdered or granular material. Such prior art layered products are significantly less durable than the products described herein because of their tendency to separate as a result of shear forces between top and bottom fabric layers, particularly where such layered products are installed over vertical or slopping surface, where shear forces are most prevalent.

The invention claimed is:

1. A method of manufacturing a water-permeable geocomposite article capable of sorbing, reacting with, or neutralizing a liquid-contained contaminant and allowing the passage of non-contaminated water therethrough comprising:
provided a pre-formed geotextile mat having an apparent opening size in the range of about 0.5 mm to about 6 mm and having opposed major surfaces;
contacting one of the major surfaces of the geotextile mat with a powdered or granular organophilic clay capable of sorbing, reacting with, or neutralizing the liquid-contained contaminant, and causing the powdered or granular organophilic clay to flow into the pre-formed geotextile mat to fill at least a portion of the pre-formed geotextile mat within openings of the mat, wherein the powdered or granular reactive material does not prevent the flow of water through the geocomposite article; and adhering a liquid-permeable cover sheet to a major surface of the pre-formed geotextile mat by needle-punching or heat sealing the cover sheet to the pre-formed geotextile mat after the mat has received the powdered or granular organophilic clay.

2. The method of claim 1 further including the step of securing another liquid-permeable cover sheet to a lower major surface of the geotextile mat before filling at least a major portion of the pre-formed geotextile mat with the powdered or granular organophilic clay.

3. The method of claim 1, further including the step of covering edges of the pre-formed geotextile mat with a sheet material layer.

4. The method of claim 3, wherein the edges of the geotextile mat are covered with excess material from one or both of the cover sheets.

5. The method of claim 4 wherein the excess material of the cover sheets are secured together to cover the edges of the geotextile mat by adhesively securing the cover sheets together over the edges of the geotextile, or heat-sealing the cover sheets together surrounding the edges of the geotextile.

6. The method of claim 1, wherein the powdered or granular organophilic clay is caused to flow into the geotextile mat by vibrating the geotextile mat while in contact with the powdered or granular organophilic clay.

7. The method of claim 1, wherein the powdered or granular organophilic clay is caused to flow into the geotextile by applying a vacuum to an undersurface of the geotextile to draw the powdered or granular organophilic clay into the mat from an upper surface.

8. The method of claim 2 further including the step of providing at least one of the cover sheets having a dimension larger than the major surface of the geotextile mat to provide excess cover material so that the excess cover material extends over an edge surface of the geocomposite article, and securing the excess cover material to the geotextile article to cover the edge surface, thereby reducing or eliminating escape of powdered or granular organophilic clay through the covered edge surface of the geotextile article.

9. The method of claim 8, including the step of covering all edge surfaces with excess cover material, and securing the excess cover material to the geocomposite article thereby reducing or eliminating escape of powdered or granular organophilic clay through all edge surfaces of the geotextile article.

10. The method of claim 8, wherein the cover sheet is secured over the edge surface by an expedient selected from the group consisting of adhesively securing, needlepunching and ultrasonic welding.

11. The method of claim 9, wherein at least one of the cover sheets is secured over all edge surfaces by an expedient selected from the group consisting of adhesively securing, needlepunching and ultrasonic welding.

12. A method of manufacturing a water-permeable multi-layer geocomposite article capable of sorbing, reacting with, or neutralizing a liquid-contained contaminant, said geocomposite article having a geotextile layer containing a powdered or granular organophilic clay adhered to an adjacent geotextile mat by needle-punching or heat sealing, said geocomposite article allowing the passage of essentially non-contaminated water therethrough, the method comprising:

providing a pre-formed geotextile mat having an apparent opening size in the range of about 0.5 mm to about 6 mm and having opposed major surfaces;

contacting one of the major surfaces of the geotextile mat with a powdered or granular organophilic clay capable of sorbing, reacting with, or neutralizing a liquid-contained contaminant, and causing a portion of the powdered or granular organophilic clay to flow into the pre-formed geotextile mat to fill at least a portion of void spaces in the pre-formed geotextile mat, wherein the powdered or granular reactive material does not prevent the flow of water through the geocomposite article;

heat-adhering a liquid-permeable cover sheet to the pre-formed geotextile mat after the mat has received the powdered or granular organophilic clay.

13. The method of claim 12, wherein the liquid-permeable cover sheet has an apparent opening size in the range of about 0.5 mm to about 6 mm, and is at least partially filled with powdered or granular organophilic clay after adhering the liquid-permeable cover sheet to the at least partially filled first geotextile layer.

14. The method of claim 1, wherein the powdered or granular organophilic clay disposed within the void spaces of the geotextile mat includes 0 to 10 lb/ft$^3$ of a sodium bentonite.

15. The method of claim 2, wherein the geotextile fibers are selected from the group consisting of polyolefin, polyester, polyamide, and copolymers of any two or more of the foregoing.

16. The method of claim 12, wherein the powdered or granular reactive organophilic clay has a particle size such that at least 90% of the particles have a size in the range of about 6 mesh to about 325 mesh.

17. The method of claim 1, wherein the geocomposite article has 30 lb/ft$^3$ to 100 lb/ft$^3$ of powdered or granular reactive organophilic clay contained therein.

18. The method of claim 12, wherein the geotextile fibers are selected from the group consisting of polyethylene fibers, polypropylene fibers, polyester fibers and polyamide fibers.

19. The method of claim 1, wherein the pre-formed geotextile mat is non-woven.

* * * * *